US011490234B2

(12) United States Patent
Haran (10) Patent No.: US 11,490,234 B2
(45) Date of Patent: Nov. 1, 2022

(54) COOPERATIVE ADAS AND COOPERATIVE SAFETY SYSTEMS AND METHODS USING V2X COMMUNICATIONS

(71) Applicant: Autotalks Ltd., Kfar Netter (IL)

(72) Inventor: Onn Haran, Bnei Dror (IL)

(73) Assignee: Autotalks Ltd., Kfar Netter (IL)

( * ) Notice: Subject to any disclaimer, the term of this patent is extended or adjusted under 35 U.S.C. 154(b) by 33 days.

(21) Appl. No.: 17/177,575

(22) Filed: Feb. 17, 2021

(65) Prior Publication Data

US 2022/0264268 A1 Aug. 18, 2022

(51) Int. Cl.
*H04N 5/44* (2011.01)
*H04W 4/40* (2018.01)
*G08G 1/133* (2006.01)
*G08B 21/02* (2006.01)

(52) U.S. Cl.
CPC .............. *H04W 4/40* (2018.02); *G08B 21/02* (2013.01); *G08G 1/133* (2013.01)

(58) Field of Classification Search
CPC .......... H04W 4/40; G08B 21/02; G08G 1/133
See application file for complete search history.

(56) References Cited

U.S. PATENT DOCUMENTS

| 8,676,466 B2 | 3/2014 | Mudalige |
| 10,909,866 B2* | 2/2021 | Jacobus ........... G08G 1/096716 |
| 2019/0009847 A1 | 3/2019 | Rech et al. |
| 2020/0342760 A1* | 10/2020 | Vassilovski ..... B60W 30/18163 |
| 2020/0410852 A1* | 12/2020 | Lee ........................ B60W 30/14 |
| 2021/0107494 A1* | 4/2021 | Silver ..................... B60W 50/14 |
| 2021/0110181 A1* | 4/2021 | Hsu ........................... G08G 1/04 |
| 2021/0179111 A1* | 6/2021 | Kim ................... B60W 60/0016 |
| 2021/0237735 A1* | 8/2021 | Ha ............................ G08G 1/166 |
| 2021/0294342 A1* | 9/2021 | Marasigan ........... G06F 16/2379 |
| 2022/0013007 A1* | 1/2022 | Balasu ...................... H04W 4/40 |
| 2022/0013014 A1* | 1/2022 | Xu ....................... G01C 21/3697 |

* cited by examiner

*Primary Examiner* — Munear T Akki
(74) *Attorney, Agent, or Firm* — Nathan & Associates; Menachem Nathan (57) ABSTRACT

Cooperative advanced driving assistance systems (ADAS) and cooperative safety systems using vehicle-to-everything (V2X) communications and methods of use. A method may comprise, by a guiding vehicle, periodically identifying an error of a nearby connected road-user and if an error is identified, transmitting a guidance message with guidance data using V2X communications to the connected road-user; and by the connected road-user as a guided road-user, using the guidance data to fix the error.

10 Claims, 8 Drawing Sheets

COOPERATIVE ADAS AND COOPERATIVE SAFETY SYSTEMS AND METHODS USING V2X COMMUNICATIONS

FIELD

Subject matter disclosed herein relates in general to safety systems and advanced driving assistance systems (ADAS) and methods using vehicle-to-everything (V2X) communications, and in particular to vehicles warning and guiding other vehicles or non-vehicle road-users through V2X communications.

BACKGROUND

Road-users (both vehicles and non-vehicles) are prone to errors. For vehicles, either human driven or machine driven ("automated" or "autonomous" driving), errors include driving errors. For non-vehicle road-users, errors include movement errors.

The two main reasons for driving errors are sensing failures and decision failures. These reasons are common to both humans and automated driving. V2X communication (or in short just "V2X") helps to prevent sensing failures, by transmitting information about a vehicle's own location and movement, and by sharing objects detected by vehicle sensors (e.g. cameras). However, V2X is not known to help to prevent decision failures. Preventing driving errors in extreme cases requires very high computing power inside a vehicle, prolonged testing, and in general limits the introduction of autonomous automated vehicles (AVs).

Each AV uses its own decision algorithm. The industry is attempting to define common driving rules. Intel's Responsibility Sensitive Safety (RSS) model for AVs captures a lot of attention. RSS defines 5 major rules: 1) do not hit the vehicle in front; 2) do not cut in recklessly; 3) give, not take right-of-way; 4) be cautious in areas with limited visibility; and 5) if a vehicle can avoid a crash without causing another one, it must.

Movement errors of non-vehicle road-users put them at a great risk. Examples of such movement errors include a bicycle entering a non-vacant intersection, a pedestrian crossing a street in a forbidden place, etc.

V2X is not known to be used to reduce driving errors or movement errors. There is therefore a need for, and it would be advantageous to have methods and systems that would allow V2X use for reducing and/or fixing such errors.

SUMMARY

Embodiments disclosed herein teach systems and methods for cooperative decisions using V2X to reduce driving and/or movement errors. As disclosed herein, "cooperative decision" implemented by a cooperative safety system, or in a term referring to vehicles as road-users "cooperative ADAS", can assist in reducing driving and/or movement errors. This since a risk scenario may fail to be deciphered properly by a single vehicle, but may look different from the point of view of other vehicles and therefore be deciphered better/more properly. A scheme introducing cooperative safety systems using V2X can help decrease the number of accidents, accelerate the market for AVs, lower AV costs, improve driving safety and efficiency of human drivers, in particularly new or elderly drivers, and improve the safety of other road-users.

In various exemplary embodiments, there are provided, in a V2X communications environment, methods comprising: by a guiding vehicle, periodically identifying an error of a nearby connected road-user, and if an error is identified, transmitting a guidance message with guidance data using V2X communications to the connected road-user; and by the connected road-user as a guided road-user, using the guidance data to fix the error.

In some embodiments, the road-user is a vehicle and the error is a driving error.

In some embodiments, the road-user is a non-vehicle and the error is a movement error.

In some embodiments, the driving error includes not maintaining a proper distance to a road-user or object ahead of the connected vehicle, and the guidance data include data on the road-user or object ahead.

In some embodiments, the driving error includes not keeping a lane boundary and the guidance data include lane boundaries and vehicle alignment within the lane.

In some embodiments, the driving error includes estimating incorrectly a right-if-way at an intersection and the guidance data include right-of-way arbitration data of each road-user at the intersection.

In some embodiments, the driving error includes speed unfitting road conditions, and the guidance data include speed guidance data on upcoming hazards and appropriate speed.

In some embodiments, the using the guidance data to fix the driving error includes, if the guidance is plausible, fusing the guidance data with internal guided vehicle data to obtain fused data and using the fused data to fix the driving error.

In some embodiments, the using the fused data to fix the driving error includes analyzing the guidance message and alerting a driver or a controller of the guided vehicle to fix the driving error based on the analysis.

In some embodiments, the analyzing includes running a plausibility check and the alerting includes alerting the driver or the controller of the guided vehicle if the plausibility check indicates the guidance data is plausible.

In various exemplary embodiments, there are provided systems in a V2X communications environment in which a vehicle can be guiding or be guided and in which a non-vehicle road-user can be guided, comprising: in each vehicle, a V2X communications unit configured to transmit and receive guidance messages, wherein a received guidance message includes received guidance data; and a cooperative ADAS unit configured to raise alerts for a guided road-user and to control movement of a road-user based on at least the received guidance data if the received guidance data is plausible.

In some embodiments, the cooperative ADAS unit includes an other road-users "monitor" module configured to check if other road-users are putting themselves or others at risk and to provide the received guidance data.

In some embodiments, the driving error includes not maintaining a proper distance to a road-user or object ahead and the guidance data include data on the road-user or object ahead.

In some embodiments, the driving error includes not keeping a lane boundary and the guidance data include lane boundaries and vehicle alignment within the lane.

In some embodiments, the driving error includes estimating incorrectly a right-if-way at an intersection and the guidance data include right-of-way arbitration data of each road-user at the intersection.

In some embodiments, the driving error includes speed unfitting road conditions and the guidance data include speed guidance data on upcoming hazards and appropriate speed.

In some embodiments, the controlling the guided vehicle alerts and the controlling the movement of a guided vehicle based on at least the received guidance data guidance data include controlling the guided vehicle alerts and controlling the movement of the guided vehicle based on fused guidance data that includes the received guidance data and internal guided vehicle data.

In an exemplary embodiment, there is provided a system in a V2X communications environment in which a vehicle can be guiding or be guided and in which a non-vehicle road-user can be guided, comprising: associated with each road-user, a V2X communications unit configured to transmit and receive guidance messages, wherein a received guidance message includes received guidance data; and a safety unit configured to raise alerts for a guided road-user and to control movement of a road-user based on at least the received guidance data if the received guidance data is plausible.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. If identical elements are shown but numbered in only one figure, it is assumed that they have the same number in all figures in which they appear. The drawings and descriptions are meant to illuminate and clarify embodiments disclosed herein and should not be considered limiting in any way. In the drawings.

DETAILED DESCRIPTION

Figure 1A:
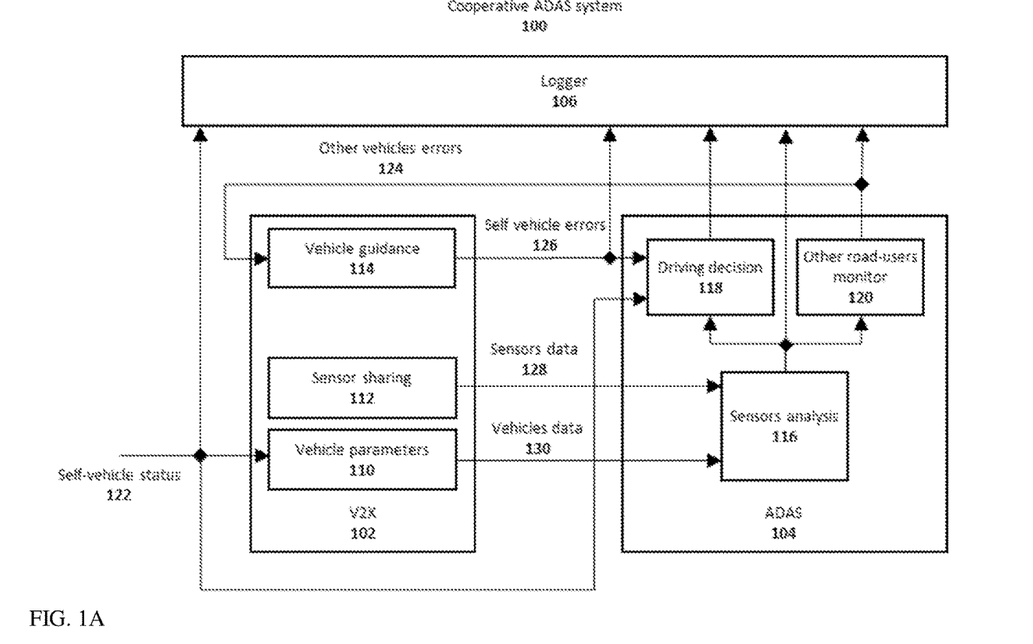
FIG. 1A illustrates a block diagram of an embodiment of a cooperative ADAS according to presently disclosed subject matter.

FIG. 1A illustrates a block diagram of an embodiment of a cooperative ADAS system for reducing driving errors numbered 100 according to presently disclosed subject matter. System 100 comprises a V2X unit 102 configured to send and receive messages, a cooperative ADAS unit 104 configured to raise vehicle alerts for a guided vehicle and to control movement of a self-vehicle based on sensors data, and a logger unit 106 for recording cooperative ADAS operation. Exemplarily, the sensors may be cameras. More details on the function(s) of each unit is/are given below. Cooperative ADAS system 100 is located in each vehicle, applicable to both low and high automation levels, when the vehicle is driven by human or by a computer. Each vehicle can guide other vehicles (i.e. be a "guiding vehicle") or be guided by other vehicles (i.e. be a "guided vehicle"), based on a given situation. Concurrent functionality of a vehicle as "guiding" and "guided" is possible as well, for example, when a vehicle guides other vehicles to avoid a crash and is guided by another vehicle to keep lane.

V2X unit 102 comprises three modules: a vehicle properties module 110 configured to transmit properties of a self-vehicle (i.e. self-vehicle status data 122) and to receive properties of other vehicles (i.e. vehicles properties data 130) e.g. as defined in standards, such as SAE J2735; a sensors sharing module 112 configured to transmit sensors data on objects perceived (detected) by self-vehicle sensors (also referred to as "internal" data) and to receive sensors data on objects perceived by other vehicles (also referred to as "received or reported sensors data"); and a vehicle guidance module 114 configured to transmit guidance messages containing other vehicles errors 124 to other road-users, and to receive guidance messages containing self-vehicle errors 126, prepared by other vehicles and directed to the self-vehicle. Road-users may include various types of vehicles, pedestrians, etc.

ADAS unit 104 also comprises three modules: a sensor analysis module 116 configured to analyze sensors data 128 obtained by sensors sharing module 112 and vehicles properties data 130 obtained by vehicle properties module 110; a driving decision module 118 configured to receive self-vehicle status data 122 and self-vehicle errors data 126 and to determine if the ADAS issues an alert (warning) to the driver of, or controls the self-vehicle and determines the nature of the control based on the self-vehicle autonomy level; and an "other road-users monitor" module 120 configured to check (based on self-vehicle status data 122) if other road-users are putting themselves or others at risk (i.e. commit a driving error) and to provide guidance data 120 to a guided vehicle through vehicle guidance module 114, even if the risk and guidance do not relate explicitly to the guiding vehicle. Driving decision module 118 is modified from known such modules in that is has an added functionality to consider driving guidance (based on self-vehicle errors data 126) as provided by other vehicles. The status data may include self-position, speed, acceleration, a vehicle parameter, etc.

Logger unit 106 collects self-vehicle sensors data 122, driving decisions data, remote sensors data perceived by other vehicles, other sensors data and guidance data to and from other road-users, managing a log and storing it. The log is updated once guidance data to and from other road-users is available. The log enables to adjust insurance premiums if these data are used in Usage Based Insurance (UBI), and to improve an ADAS decision algorithm by analyzing scenarios of guidance received from other vehicles.

In some cases, movement errors of non-vehicle road-users can be reduced by using a cooperative safety system similar to the one of FIG. 1A, but simplified and adapted for this purpose.

Figure 1B:
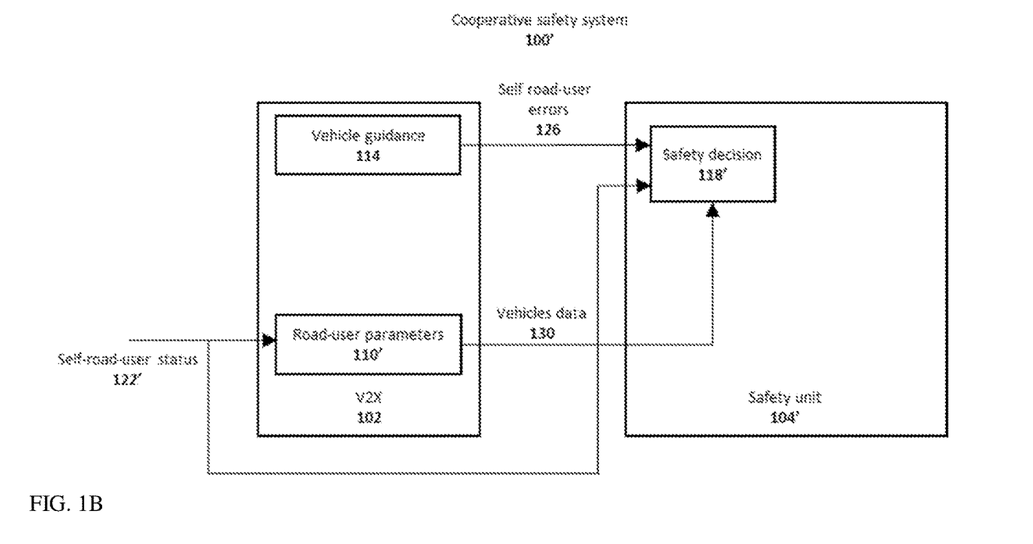
FIG. 1B illustrates a block diagram of an embodiment of a cooperative safety system for non-vehicles according to presently disclosed subject matter.

FIG. 1B illustrates a block diagram of an embodiment of a cooperative safety system for reducing movement errors numbered 100' according to presently disclosed subject matter. System 100' comprises a V2X unit 102' configured to send and receive messages and a cooperative safety unit 104' configured to raise alerts for a guided road-user based on sensors data. More details on the function(s) of each unit is/are given below. Cooperative safety system 100' is located in each non-vehicle road-user.

V2X unit 102' comprises two modules: a vehicle properties module 110 configured to transmit properties of a self-vehicle (i.e. self-vehicle status data 122) and to receive properties of other vehicles (i.e. vehicles data 130) e.g. as defined in standards, such as SAE J2735; and a road-user guidance module 114' configured to receive guidance messages containing road-user errors 126, prepared by other vehicles and directed to the road-user. Safety unit 104' comprises a safety decision module 118' configured to receive self-vehicle status data 122 and self-vehicle errors data 126 and to determine if the safety issues a warning to the road-user.

Figure 1C:
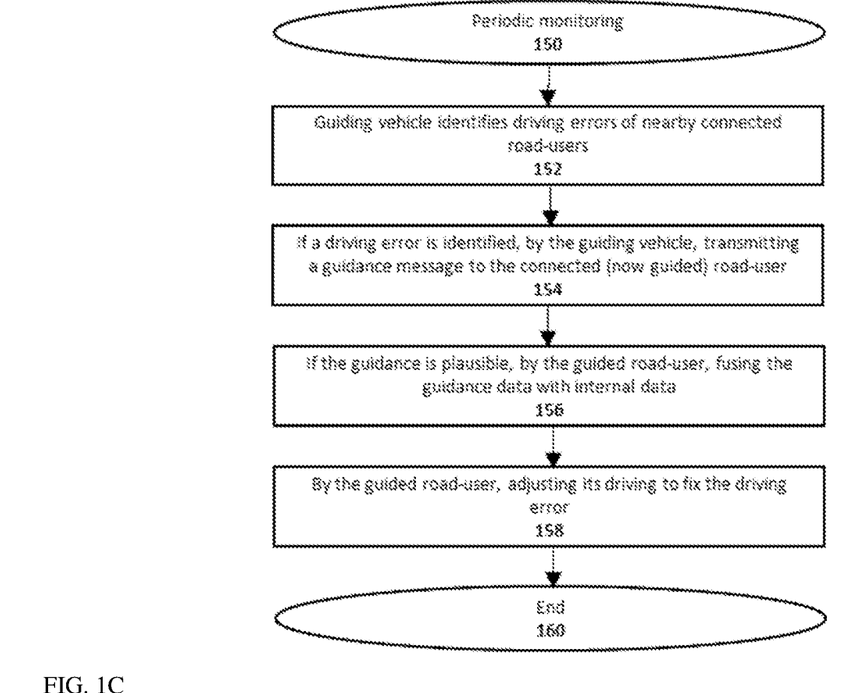
FIG. 1C illustrates a flow chart of an exemplary guidance method according to presently disclosed subject matter.

FIG. 1C illustrates a flow chart of an exemplary general guidance process according to presently disclosed subject matter. Operation begins periodically in step 150. An exemplary period may be 1 second. In step 152, a guiding vehicle identifies a driving error of a nearby connected road-user, which user will become a "guided road-user". The driving error may be one of at least four: 1) not maintaining a proper distance (gap) to a road-user or object ahead, which can cause a crash; 2) not keeping a lane boundary (also referred to as "lane misalignment"); 3) estimating incorrectly a right-of-way; and 4) speeding without accounting for road conditions (also referred to as "speed unfitting road conditions"). The road-user can be of any type, e.g. a vehicle, a two-wheeler, even a pedestrian, though most of the driving errors are relevant only for vehicles. In step 154, if a driving error is identified for the guided road-user, the guiding vehicle transmits a guidance message to the connected (now guided) road-user. In step 156, the guided road-user fuses (combines) the guidance data with internal data, if the guidance is plausible. The plausibility of the guidance is decided for example as described with reference to FIGS. 5-9 below. Implausbile message content is unlikely to arrive from a valid functioning road-user device. It may be resulted from a malfunction or a security attack. The guided road-user ignores implausible guidance, and adopts the guidance based on its confidence in internal data and confidence in guidance data. In step 158, if the guided road-user is a vehicle, the guided vehicle adjusts its driving to fix the driving error. For example, the guided vehicle may apply an automatic brake to avoid a crash, steer to change its location inside a lane to correct lane misalignment, decide to give or take right-of-way, or adjust its speed to account for road conditions. If the guided road-user is not a vehicle, but is for example a road-user that rides a bicycle, rides an eScooter, rides a scateboard or walks, in step 158 the guided road-user adjusts its movement to prevent a risk associated with a movement error. Operation ends in step 160.

Figure 2:
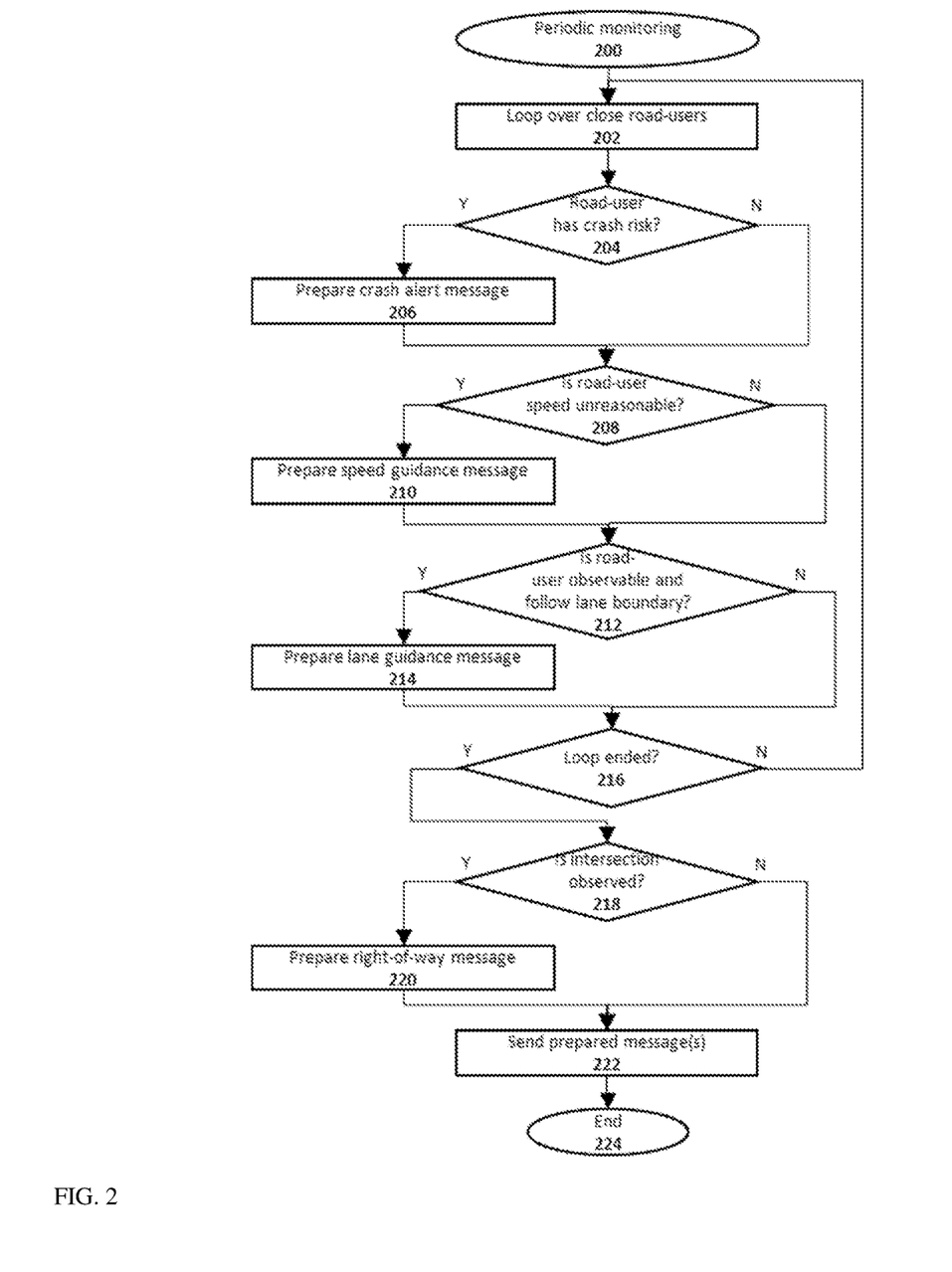
FIG. 2 illustrates a flow chart of vehicle guidance preparation.

FIG. 2 illustrates a flow chart of exemplary vehicle guidance as performed by other road-users monitor module 120. In this example, the road-users referred to are only vehicles. The vehicle guidance is performed in each vehicle acting as guiding vehicle. Periodic monitoring begins in step 200. Commonly, the period is 100 msec to guide in real-time, yet a longer period can be applied for reducing processing requirements. Next, in step 202, a loop is performed over close (nearby) road-users. The reason of focusing only on close road-users is to limit the processing power of the guiding vehicle by limiting the number of other guided vehicles that are analyzed, and to limit the processing power of the guided vehicle by limiting the number of messages that need to be processed. Communication bandwidth is limited as well. Close road-users are defined as the closest M V2X road-users ahead of the guiding vehicle and the closest L V2X road-users behind the guiding vehicle. In an example, M=6 and L=2. The loop chooses one or more guided road-users for further processing.

A check is performed by the guiding vehicle in step 204 if each close road-user has a crash risk. A crash can be with road-users or objects ahead, checking longitudinal distance, and with vehicles aside, checking lateral safe distance. Vehicle kinematics (i.e. location, speed, trajectory, etc.) may arrive at the guiding vehicle from multiple sources, e.g. from the sensors of the guiding vehicle, from V2X transmissions of other vehicles, and from shared sensors (i.e. from each sensors sharing module 112 of another V2X vehicle). If crash risk is not observed (No), operation jumps to step 208. Otherwise (Yes), operation continues from step 206 in which a crash alert message is prepared. Operation continues to step 208, which checks if the speed of a guided road-user is reasonable. Various road conditions in the lane driven by the guided road-user are analyzed, for example ice, speed bumps, curves or other obstacles, weather conditions like rain or fog, and safety related events such as a stopped vehicle, a bus station, a bus stopping at a bus station, a crosswalk, a car stopping next to a crosswalk, an intersection ahead, or a car stopping at an intersection. The speed calculation does not consider the official speed limits when driving too fast, since this would lead drivers to disrespect guidance from other vehicles. Speed limits are considered when other drivers are guided to drive faster, but not considered when they are guided to drive slower. In the former case, the speed guidance will not exceed the speed limit. If the calculated speed is not within a few percentages of the actual speed, operation continues from step 210, in which a speed guidance message is prepared. Otherwise, there is no reason to prepare a message, and operation jumps to step 212.

Next, a check is performed in step 212 if the guided road-user is observable (i.e. if one of the visual sensors of the guiding vehicle captures the road-user) and if the road user follows a lane boundary. If the answer to either question (check) is No, then operation jumps to step 216. Otherwise (Yes), operation continues from step 214 in which a lane guidance message is prepared. A lane boundary is normally marked. However, in some cases the marking is not clear, whether temporarily due to bad weather or permanently due to bad marking. In such cases, vehicles can guide each other. Operation continues from step 216, where a check is made if the loop from step 202 ended. If No, operation returns to step 202 to check more road-users.

If the loop ended in check 216 (Yes), operation continues to step 218, which checks if the guiding vehicle observed an intersection. If No, operation jumps to step 222, in which one or more prepared guidance messages are sent (transmitted or broadcast) by the guiding vehicle to other vehicles. If Yes, a right-of-way message is prepared in step 220. The message calculates the likelihood of all road-users to take right-of-way, and indicates the vehicle entitled to right-of-way. The prepared message or messages, if existing, is/are transmitted in step 224. Operation ends in step 226.

Figure 3:
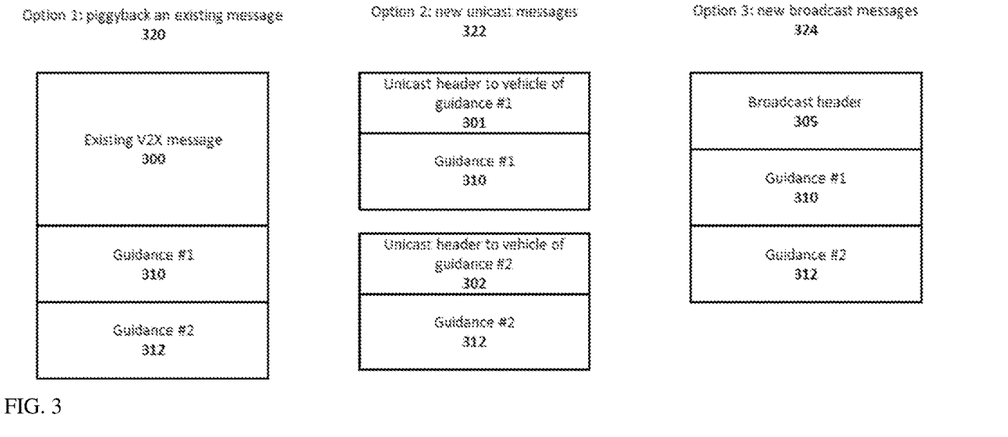
FIG. 3 illustrates options of vehicle guidance messages.

FIG. 3 illustrates examples (by no means limiting) of vehicle guidance message embodiments ("options"). A first exemplary option 320, which may be the easiest, is to specify and includes piggybacking one or more new guidance messages, 310, 312, etc. on an existing V2X message 300. A second exemplary option 322 includes sending a dedicated unicast message to each guided road-user. The guidance may involve more than a single road-user because when a driver makes a mistake, both the driver and the vehicle at risk should be aware to avoid a potential accident.

Thus, several messages may be required per a single safety event. A third exemplary option 324 defines a new broadcast message, only carrying a newly defined guidance container.

Figure 4:
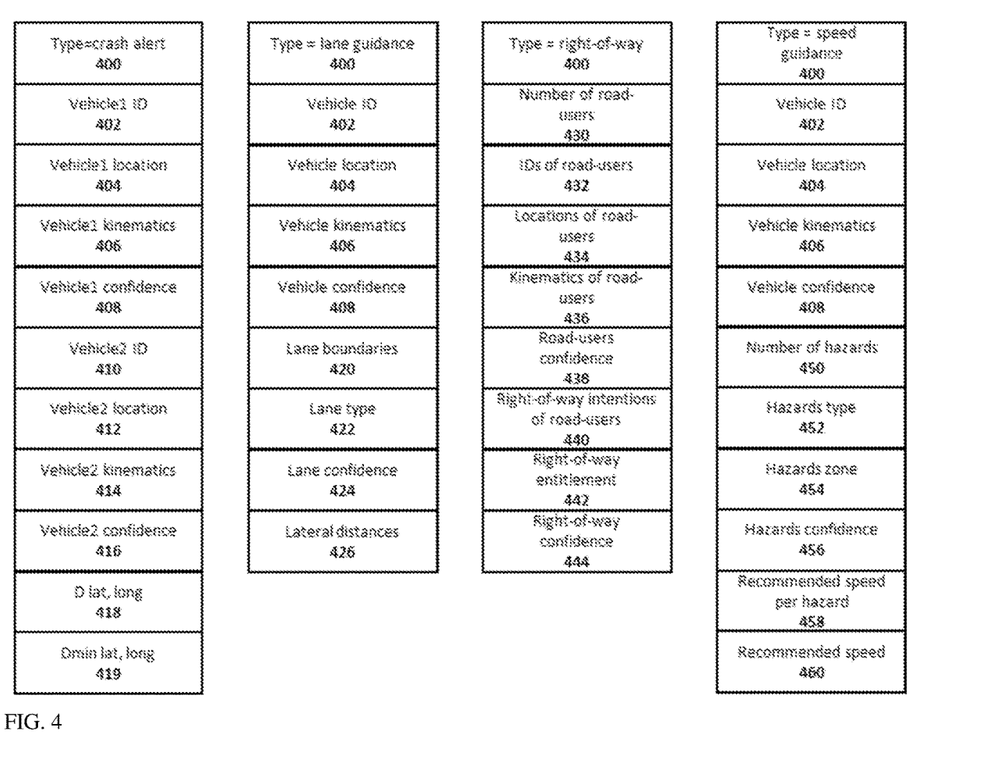
FIG. 4 illustrates content of vehicle guidance messages.

FIG. 4 illustrates examples (by no means limiting) of vehicle guidance message contents. Four different messages are defined: crash alert guidance, lane guidance, right-of-way guidance and speed guidance. More messages can be added. Fields with identical number and identical location have identical meanings in each of the different messages. In each message, field 400 describes the message type.

First, assume a rear-end accident prevention scenario. The relevant guidance message in this scenario is a crash alert guidance message. In such a scenario, two vehicles are involved, vehicle #1 and vehicle #2. At least one of the vehicles is connected. In the crash alert guidance message, an identifier (ID) of vehicle #1 is described in field 402. The ID may be a communication identifier, such as a MAC address for DSRC or L2_ID for C-V2X. In case the vehicle is not connected, the ID represents the road-user type, defining a different constant value for a pedestrian, a cyclist, a motorcycle, a vehicle, a truck, a bus, etc. For example, a pedestrian may be identified as 48'hFFFF FFFF FFFF. The location of vehicle #1 is described in field 404. The location can follow the existing representation method of SAE J2735. The kinematics of vehicle #1 are described in field 406. The kinematics may include speed, heading and accelerations potentially as defined by SAE J2735. A confidence value (or simply "confidence") of the positioning and kinematics parameters of vehicle #1 is located in field 408. Position confidence can follow the SAE J2735 definition. The ID, location, kinematics and confidence of vehicle #2 may be placed in fields 410, 412, 414 and 416 respectively, following the same format of vehicle #1 fields. Field 418, may include longitudinal and lateral distances from vehicle #1 to vehicle #2, while field 419 may include minimal distances that need to be kept for safe driving.

Next, assume a head-on and/or side collisions prevention scenario. The relevant guidance message in this scenario is a lane guidance message. In such a message, fields 402, 404, 406 and 408 may describe respectively the ID, location, kinematics and confidence value of the guided vehicle. Right and left lane boundaries may be defined in field 420, with the lane location, offset and rotation based on SAE J2735. Field 422 may include the lane type, described if lane definition is based on a marking, a map, alignment to another vehicle, or neither. A lane confidence value in field 424, describes the certainty that the lane definition is accurate. It does not represent the lane location accuracy, but may include a value between 0 and 1, where 1 is maximum confidence and 0 is no confidence. Lateral distances between the vehicle and the lane boundaries for right and left sides may be listed in field 426.

Next, assume an angle accident prevention scenario. The relevant guidance message in this scenario is a right-of-way guidance message. In such a message, field 430 describes the number of road-users involved in the scenario. Multiple road-users can be involved (over a minimum of 2), for example up to four in a 4-way stop case, or even more than four in a roundabout. Field 432 contains the IDs of all road-users, field 434 contains their locations, field 436 contains their kinematics, and field 438 contains their confidence. Field 440 contains the right-of-way estimation values (or simply "right-of-way estimation") of each road-user. The right-of-way estimation is 100% when a road-user certainly takes the right-of-way, and 0% when it certainly does not take the right-of-way. A "fused" (i.e. based on data from various sources) right-of-way estimation is calculated based on road-user speed, acceleration and location relative to a stop line. For example, the following equation may be used:

$$\text{Fused right-of-way estimation} = a + b*\text{distance after stop line} + c*\text{speed} + d*\text{acceleration} \quad (1)$$

where "*" denotes multiplication, the distance is given in meters (m), the speed is in m/s and the acceleration is in $m^2/s$, and where after the calculation the resulting fused value is limited between 0 and 1. An exemplary initial set of parameters may be a=0.2, b=0.2, c=0.04, and d=0.2. Field 442 indicates the ID of the road-user supposed to have right-of-way (entitlement) according to traffic laws. Field 444 describes the confidence in the right-of-way. For example, the guiding vehicle may not know for sure which road-user arrived first at an intersection in a 4-way stop, or if a road-user can enter a roundabout safety, so the confidence will be lower in such cases. The right-of-way estimation equation is vendor specific, and may be based on artificial intelligence (AI).

Higher speed than suited to road conditions brings risks for driver self-accidents and to other drivers. Lower speed than fitting suited to road conditions annoys other drivers. The relevant guidance message in this scenario is a speed guidance message. In such a message and as above, fields 402, 404, 406 and 408 may describe the ID, location, kinematics and confidence value of the guided vehicle. Field 450 contains the number of safety hazards applicable to the guided vehicle. Field 452 contains the hazard types, having several possible values, as previously described for step 208. The guided vehicle considers hazards according to its map and hazards observed by guiding vehicle or other vehicles. Field 454 provides the location of each hazard. The location can span a large area, for example when describing fog, or a small area, for example when describing a pothole. Field 456 provides both the confidence in the position of the hazard and the confidence in the existence of the hazard, in percentages. Field 458 estimates the suitable speed for the hazard. For example, fog may require slowing to 50 km/h, while for passing the pothole the speed should slow down to 10 km/h. The overall recommended speed 460 is a vector of the recommended speeds for every second from now to the next N seconds. For example, N is 3, and speeds are provided for now and 1, 2 and 3 seconds ahead.

Following flow charts FIGS. 5, 6, 7A, 7B, 8 and 9 reflect methods performed in a guided vehicle that receives a guidance message from a guiding vehicle.

Figure 5:
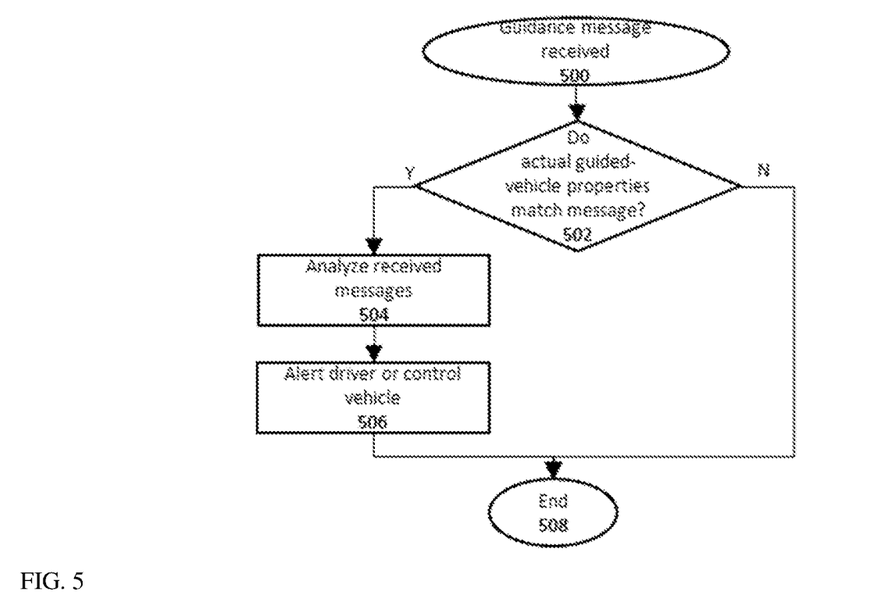
FIG. 5 illustrates a flow chart of vehicle guidance message processing.

FIG. 5 illustrates a flow chart of vehicle guidance message processing. Operation begins in step 500, after receiving a guidance message. Following steps 502-504 reflect an overall secondary plausibility check. In step 502, an initial plausibility check is made if actual guided vehicle properties match the values received in the message ("message properties"). If No, then the message is wrong, and ignored by jumping to end 508. If Yes, the operation continues to step 504, in which the received message is analyzed. The analysis is different per each received message, as described in more detail below. Operation then continues to step 506, to alert the driver of, or a controller (not shown) of the guided vehicle to fix a driving error as required by the analysis. The driving error can be fixed either by a human driver, using alerts, or automated driving, using vehicle control. Operation ends in step 508 with finishing the processing of the guidance message.

Figure 6:
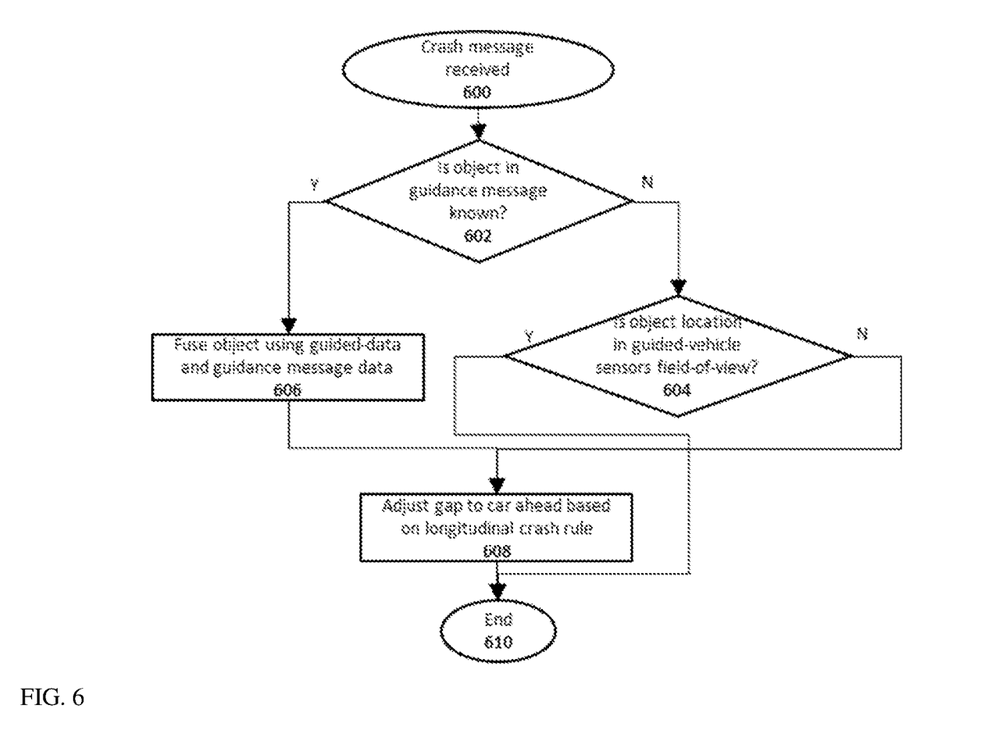
FIG. 6 illustrates a flow chart of crash message processing.

FIG. 6 illustrates a flow chart of crash alert guidance message processing. The operation is part of the execution of step 504. Operation begins in step 600 after a crash alert guidance message is received at the guided vehicle. Following steps 602-604 reflect an overall secondary plausibility check. Next, in step 602, the properties (i.e. the location, kinematics, confidence values, IDs, etc. of vehicles #1 and #2) of an object with which the guided vehicle is about to crash ("reported object") are checked. The properties reflect "reported object data". The checking includes several sub-steps, starting with step 602 that checks if the received object is known to the guided vehicle. The check searches for the reported object at the location received in the message within all known objects detected by all guided vehicle sensors. If the received object is not known (No in step 602), the operation continues to step 604, where a check is made if the location of the reported object is in the field of view (FOV) of sensors of the guided vehicle, i.e. if the guided vehicle sensors were supposed to detect the reported object at the reported location. For example, if a sensor is a front camera capable to detect objects 120 meters away within a 30 degree FOV, then the object will not be observed if located 130 meters away or at 31 degrees. Check 604 then considers if another (second) object detected by sensors of the guided vehicle may hide the reported object, for example, if the reported object is 40 meters away, but the guided vehicle camera detected other objects 20 meters away. If both checks in step 604 yield Yes, and the reported object was supposed to be observed, then the operation jumps to end 610. If one of the checks in step 604 yields No, then the reported object needs to be considered, and the operation continues to step 608 where the gap to the road-user or object ahead is adjusted based on a longitudinal crash rule. These conditions are known and described in the art, using Time-to-Collision movement equations. From step 608, the operation continues to end 610.

If Yes in step 602, i.e. the reported object is known, then the operation continues to step 606. In step 606, the object data is fused with internal data using the guided vehicle location and kinematics and the guidance message location and kinematics. The fusion averages the values of locations with the confidence values, but gives a smaller weigh to the reported location. For example, the following equation may be used:

$$\text{Fused location } X = [\text{guided vehicle location } X * \text{guided vehicle confidence} + \text{guiding vehicle location } X * (\text{guiding vehicle confidence}/2)] / (\text{guided vehicle confidence} + \text{guiding vehicle confidence}/2). \quad (2)$$

With the fused location value, the operation continues to step 608. Note that steps 602 and 604 represent a "plausibility check". The plausibility check (with a Yes answer to both checks 602 and 604) validates that a guidance message content is plausible.

Figure 7A:
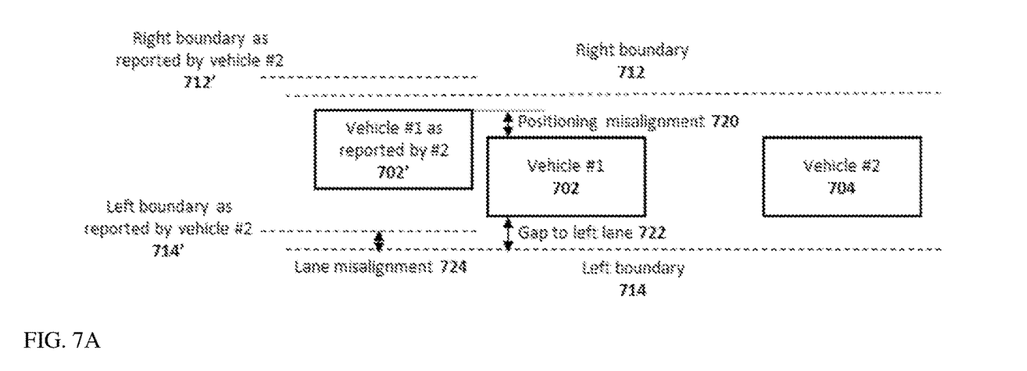
FIG. 7A illustrates an example of lane guidance.

FIG. 7A illustrates an example of lane guidance. Two vehicles, #1 and #2 travel on a lane defined by right and left boundaries. Vehicle #1, currently at a position 702 is guided by vehicle #2, currently at a position 704. Each vehicle has an independent positioning source, which introduces a respective error with respect to ground truth. The sum of the respective errors is a relative positioning error. As a result, vehicle #2 reports a vehicle #1 position 702' potentially different from current position 702. The lane detection system of each vehicle can also obtain a slightly different lane boundary definition for the other vehicle that one defined internally. As a result, the positions of left and right boundaries 712' and 714' transmitted in guidance messages differ from internally measured lane boundary positions, such that position 702' is a bit closer to an internal right lane boundary 712 (the true position of the lane boundary as deduced from vehicle #1 sensors). Vehicle #1 is supposed to measure first perpendicular distance (positioning misalignment) 720 between 702' and the historical and projected path of 702. As mentioned above, positioning misalignment 720 should be deducted from vehicle #2 lane boundaries 712' and 714'. Then, the lane boundaries are adjusted according to Eq. 3 with vehicle #1 internal lane boundaries 712 and 714. Distance 702 of vehicle #1 to left lane boundary 714 is smaller than the distance 702' to 714' reported by vehicle #2, thus the adjustment will increase a bit the gap to left lane 722.

Figure 7B:
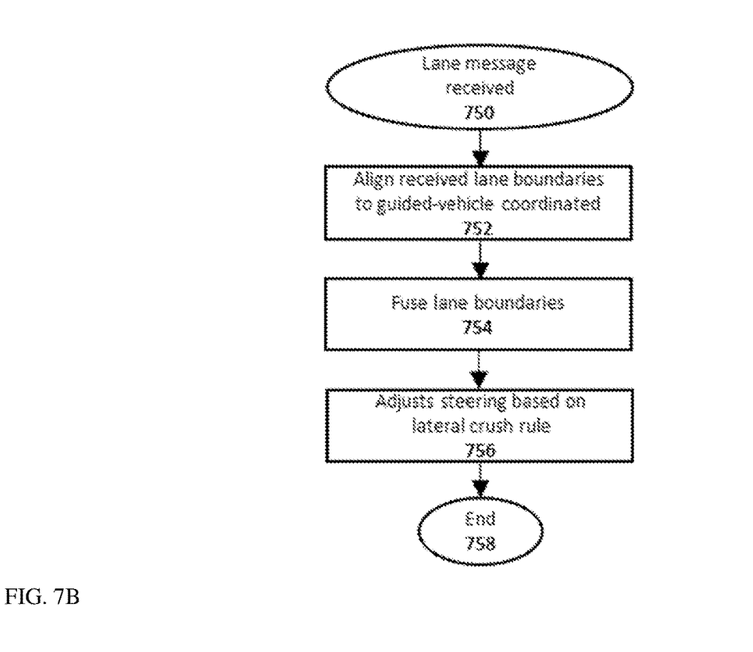
FIG. 7B illustrates a flow chart of lane message processing.

FIG. 7B illustrates a flow chart of lane guidance message processing. The operation is part of step 504 for the specific lane guidance message arrival. Operation begins in step 750 after a lane guidance message is received. In step 752, guiding vehicle lane parameters 402-406 are adjusted to internal guided vehicle coordinates. The position of different vehicles can differ, therefore the guiding vehicle lane parameters need to be adjusted to compensate for the difference. A first perpendicular distance 720 between the guiding vehicle location and the internal guided vehicle position (FIG. 7B) reflects positioning misalignment that should be deducted from the lane boundaries defined in field 420. In step 754, the internal guided vehicle definition of lane boundaries is adjusted with the guiding vehicle value. A second perpendicular distance 724 between the adjusted lane boundaries and local lane boundaries (FIG. 7B), which reflects lane misalignment is measured in the guided vehicle. The second perpendicular distance is weighted according to confidence, giving a lower weight to the guidance message. For example, the following equation may be used:

$$\text{Adjusted guided vehicle lane misalignment} = (\text{guided vehicle lane misalignment} * \text{guiding vehicle confidence}/4)/(\text{guiding vehicle confidence}/4 + \text{guide vehicle confidence}) \quad (3)$$

The adjusted value is used to change the lane boundary in the guided vehicle. In step 756, steering is adjusted based on lateral crash rules. These rules are defined in the literature and consider the movement equation of one vehicle moving into another vehicle lane. Operation ends in step 758.

Figure 8:
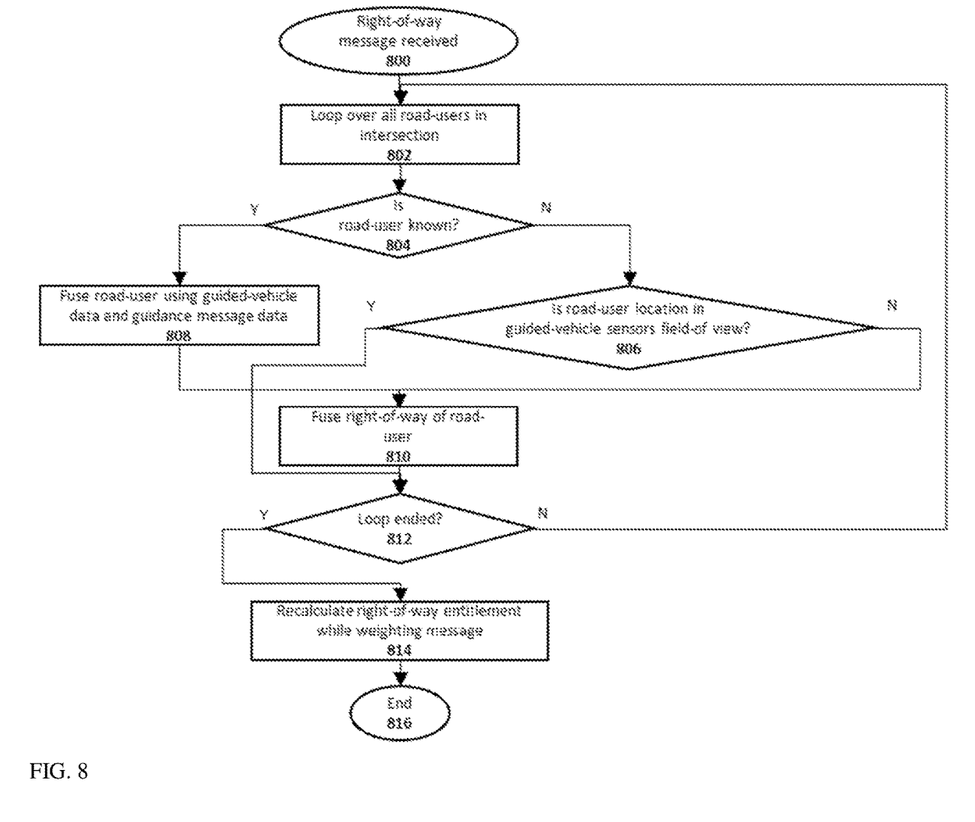
FIG. 8 illustrates a flow chart of right-of-way message processing.

FIG. 8 illustrates a flow chart of right-of-way message processing. Operation begins in step 800 after a right-of-way message is received. Step 802 starts a loop over all road-users in the intersection, as taken from field 430. The loop selects a single road-user for the operation for the next steps. Following steps 804-808 reflect an overall secondary plausibility check. In step 804, check is performed if the selected road-user is known, similar to the check in step 602. If the road-user is known, the operation continues to step 808, where the selected road-user data is fused using the guided vehicle (internal) data and guidance message data, fields 434, 436 and 438, similar to the operation of step 606. The operation continues to step 810. The road user right-of-way is recalculated based on the fused value of step 808, and further fused with the message right-of-way, field 440. For example, the following equation may be used:

$$\text{Fused right-of-way} = (\text{right-of-way local} + \text{right-of-way message}/4)/1.25. \quad (4)$$

If the result of the check of step 804 was negative (No) and the selected road-user is not known, operation continues to step 806. A check is made if the location of the selected road-user is within the sensors FOV in step 604. If the road-user is known, the operation jumps directly to step 812. Otherwise, the operation continues to step 810 and from there to 812.

Step 812 checks if the loop ended. If No, the operation returns to step 802, where the next road-user is selected. If Yes in step 812, the operation continues to step 814. The right-of-way entitlement is recalculated while weighting the message right-of-way entitlement value, field 442, and its confidence, field 444, as external constraints. Typically, a Neural Network (NN) is used to determine right-of-way, after the NN is trained using multiple intersections and analyzed rights-of-way. Operation ends in step 816.

Figure 9:
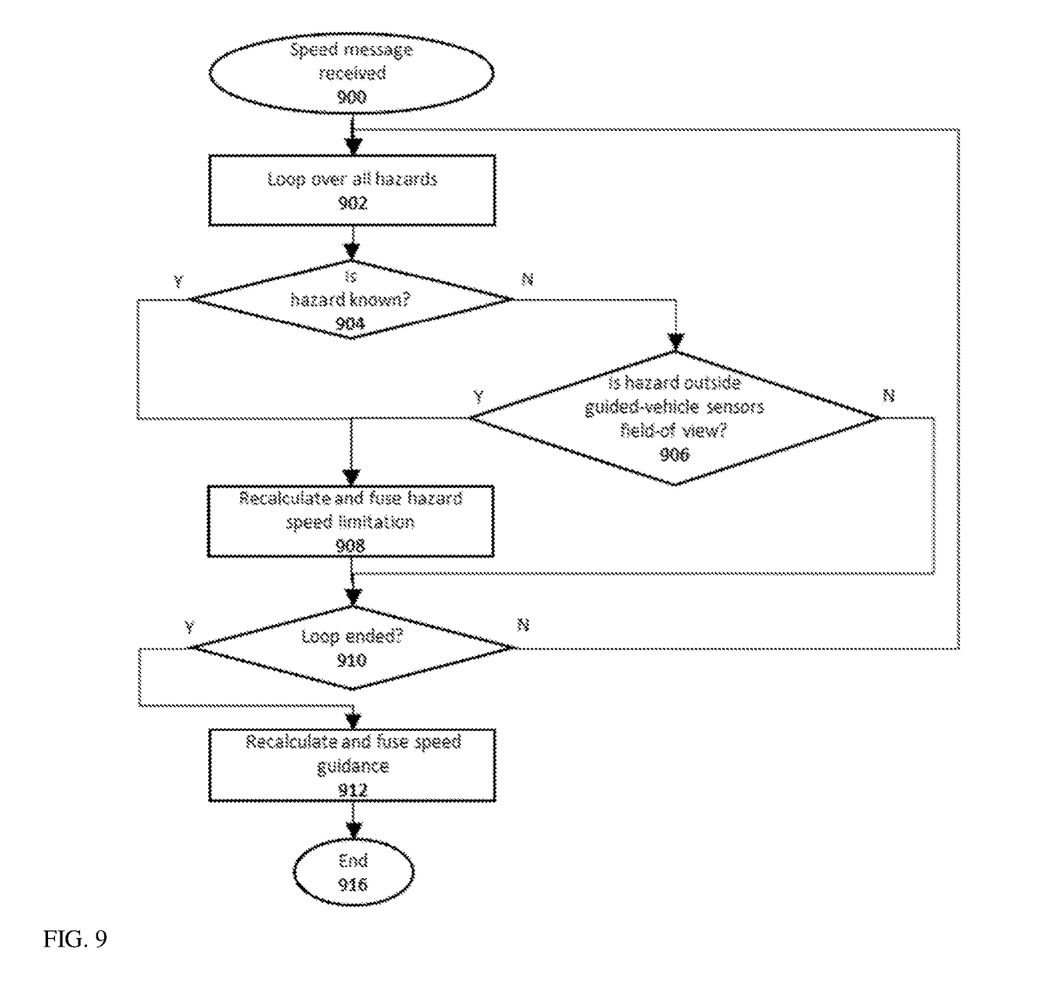
FIG. 9 illustrates a flow chart of speed message processing.

FIG. 9 illustrates a flow chart of speed message processing. The operation is part of step 504 for the specific speed message arrival. Operation begins in step 900 after a speed message is received from a guiding vehicle. Step 902 starts a loop over all hazards, as taken from field 450. The loop selects a single hazard from field 452 for the operation in the following steps. Following steps 904-908 reflect an overall secondary plausibility check. In step 904, a check is performed if the hazard is known. As opposed to step 602, which used the location as the comparison criteria for vehicle existence, here the hazard type determines the check. For example, there is no location for fog, and the location of stopped traffic may be inaccurate as well, so it is defined in field 454 as a "zone".

If the result of the check of step 904 is No and the hazard is not known, operation continues to step 906 which checks if the location of the hazard is outside the sensors of the guided vehicle FOV. If Yes in step 904, i.e. if the hazard is known, the operation jumps directly to step 908, where the internal recommended speed for the hazard is fused with the guiding vehicle speed recommended speed for the hazard. If No in step 906, operation continues directly to step 910. If Yes in step 906, operation continues to step 908. For example, the following equation may be used:

$$\text{Fused target speed} = (\text{internal target speed} + \text{guiding vehicle target speed}/4)/1.25 \quad (5)$$

From step 908, operation continues to step 910, which checks if the loop ended. If No, the operation returns to step 902, where the next hazard is selected. If Yes, the operation continues to step 912. The internal target speed of the guided vehicle is calculated, by calculating the required speed at the current location for each hazard and taking the minimal value. That is, if two hazards exist, one 20 m ahead where the speed should be 40 km/h, and the other 40 m ahead, where the speed should be 30 km/h, then the target speed should be 30 km/h.

This step can be implemented as well using a Neural Network, using the speed recommendation in the message field 460 as an input to the network. Operation ends in step 914.

It is appreciated that certain features of the presently disclosed subject matter, which are, for clarity, described in the context of separate examples, may also be provided in combination in a single example. Conversely, various features of the presently disclosed subject matter, which are, for brevity, described in the context of a single example, may also be provided separately or in any suitable sub-combination. For example, Equations 1-5 represent only one way of different ways to calculate respective values and are by no means limiting.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

Some stages of the aforementioned methods may also be implemented in a computer program for running on a computer system, at least including code portions for performing steps of a the relevant method when run on a programmable apparatus, such as a computer system or enabling a programmable apparatus to perform functions of a device or system according to the disclosure. Such methods may also be implemented in a computer program for running on a computer system, at least including code portions that make a computer execute the steps of a method according to the disclosure.

While this disclosure has been described in terms of certain examples and generally associated methods, alterations and permutations of the examples and methods will be apparent to those skilled in the art. The disclosure is to be understood as not limited by the specific examples described herein, but only by the scope of the appended claims.

What is claimed is:

1. In a vehicle-to-everything (V2X) communications environment, a method comprising:
   by a guiding vehicle, periodically identifying a driving error of a connected road-user, and if a driving error is identified, transmitting a guidance message with guidance data using V2X communications to the connected road-user; and
   by the connected road-user as a guided road-user, using the guidance data to fix the driving error, wherein the using the guidance data to fix the driving error includes, if the guidance is plausible, fusing the guidance data with internal guided vehicle data to obtain fused data and using the fused data to fix the driving error.

2. The method of claim 1, wherein the road-user is a non-vehicle and wherein the error is a movement error.

3. The method of claim 1, wherein the driving error includes not maintaining a proper distance to a road-user or object ahead of the connected vehicle, and wherein the guidance data include data on the road-user or object ahead.

4. The method of claim 1, wherein the driving error includes not keeping a lane boundary and wherein the guidance data include lane boundaries and vehicle alignment within the lane.

5. The method of claim 1, wherein the driving error includes estimating incorrectly a right-if-way at an intersection and wherein the guidance data include right-of-way arbitration data of each road-user at the intersection.

6. The method of claim 1, wherein the driving error includes speed unfitting road conditions and wherein the guidance data include speed guidance data on upcoming hazards and appropriate speed.

7. The method of claim 1, wherein the guided road-user is a guided vehicle, wherein the using the fused data to fix the driving error includes analyzing the guidance message and alerting a driver or a controller of the guided vehicle to fix the driving error based on the analysis.

8. The method of claim 6, wherein the analyzing includes running a plausibility check and wherein the alerting includes alerting the driver or the controller of the guided vehicle if the plausibility check indicates the guidance data is plausible.

9. A system in a vehicle-to-everything (V2X) communications environment in which a vehicle can be guiding or be guided and in which a non-vehicle road-user can be guided, comprising: in each vehicle,
   a vehicle-to-everything (V2X) communications unit configured to transmit and receive guidance messages, wherein a received guidance message includes received guidance data; and a cooperative advanced driving assistance system (ADAS) unit configured to raise alerts for a guided road-user and to control movement of a road-user based on at least the received guidance data if the received guidance data is plausible,
   wherein the cooperative ADAS unit includes a road-users monitor module configured to check if other road-users are putting themselves or others at risk and to provide the received guidance data.

10. A system in a vehicle-to-everything (V2X) communications environment in which a vehicle can be guiding or be guided and in which a non-vehicle road-user can be guided, comprising: in each vehicle,
   a vehicle-to-everything (V2X) communications unit configured to transmit and receive guidance messages, wherein a received guidance message includes received guidance data; and
   a cooperative advanced driving assistance system (ADAS) unit configured to raise guided road-user alerts for a guided road-user and to control movement of the guided road-user wherein the configuration to raise the guided road-user alerts and to control the movement of the guided road-user is based on, if the received guidance data is plausible, fused guidance data that includes the received guidance data and internal guided vehicle data.

* * * * *